J. C. Clime,
Musical Notation,
Nº 69,179.  Patented Sept. 24, 1867.

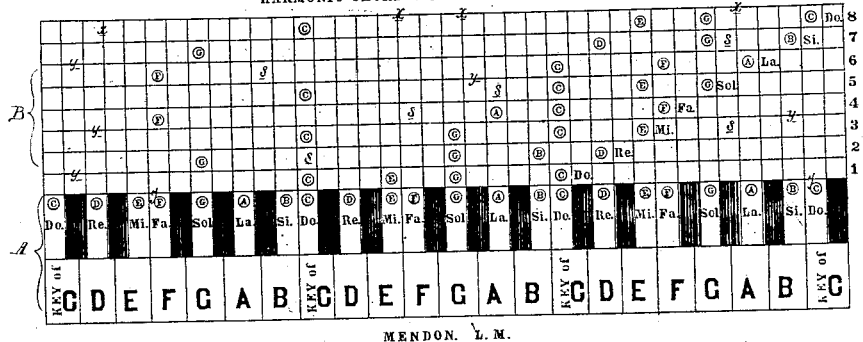

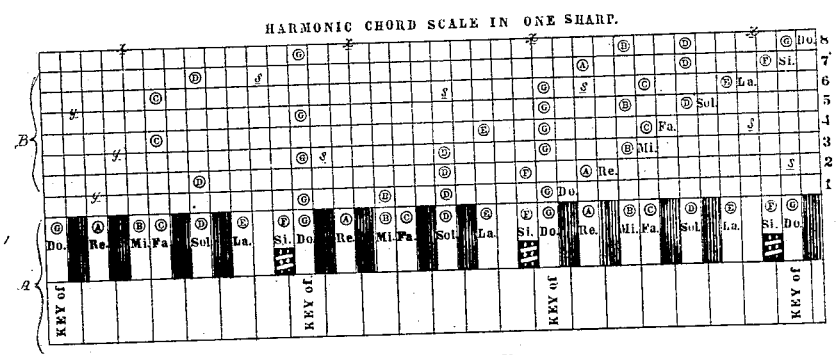

Sheet 3-12 Sheets.

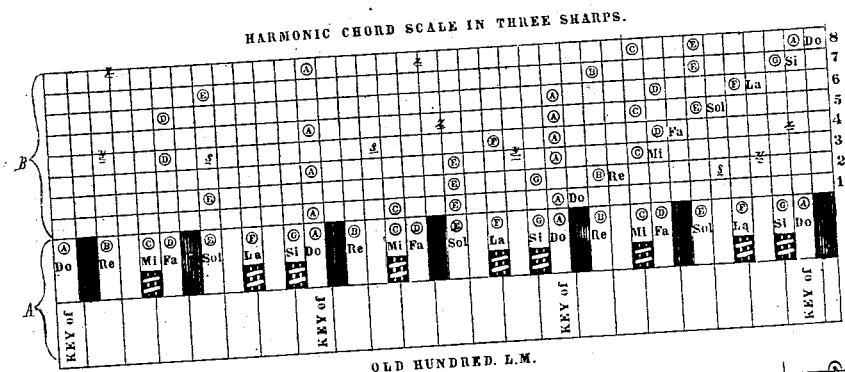

J. C. Clime,
Musical Notation,
N° 69,179. Patented Sept. 24, 1867.

Sheet 5-12 Sheets.

J. C. Clime,
Musical Notation,
No. 69,179. Patented Sept. 24, 1867.

J. C. Clime,
Musical Notation,
Nº 69,179. Patented Sept. 24, 1867.
Sheet 7 - 12 Sheets.
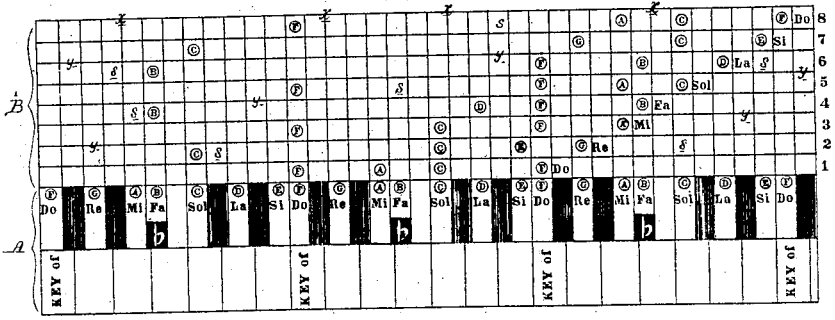

J. C. Clime,
Musical Notation,
No. 69,179. Patented Sept. 24, 1867.

Sheet 8—12 Sheets.

HARMONIC CHORD SCALE IN TWO FLATS.

FOREST. L. M.

O that my load of sin were gone, O that I could at last sub-mit

At Je-sus' feet to lay it down! To lay my soul at Je-sus' feet.

Witnesses:

J. C. Clime,
Musical Notation,
No. 69,179. Patented Sept. 24, 1867.

Sheet 9—12 Sheets.

J. C. Cline,

Musical Notation,

No. 69,179. Patented Sept. 24, 1867.

HARMONIC CHORD SCALE IN FOUR FLATS.

FLUSHING. C. M.

Sal-va-tion, O the joy-ful sound! 'Tis mu-sic to our ears;
A sov'-reign balm for ev'-ry wound, A cor-dial for our fears.

J. C. Clime,
Musical Notation,
No. 69,179. Patented Sept. 24, 1867.

Sheet 11 – 12 Sheets.

J. C. Clime,
Musical Notation,
No. 69,179. Patented Sept. 24, 1867.

United States Patent Office.

J. C. CLIME, OF PHILADELPHIA, PENNSYLVANIA.

Letters Patent No. 69,179, dated September 24, 1867; antedated September 11, 1867.

MODE OF TEACHING MUSIC.

*The Schedule referred to in these Letters Patent and making part of the same.*

TO ALL WHOM IT MAY CONCERN:

Be it known that I, J. C. CLIME, of Philadelphia, Pennsylvania, have invented certain Diagrams for Use in Teaching Music; and I do hereby declare the following to be a full, clear, and exact description of the same, reference being had to the accompanying drawing, and to the letters of reference marked thereon.

My invention consists of certain diagrams, constructed, as fully described hereafter, so that the sounds which combine to form cords in different musical keys may be quickly ascertained, and so that the keys of a piano or other similar instrument which should be struck to produce such sounds may be plainly indicated to the pupil.

In order to enable others skilled in art to make and use my invention, I will now proceed to describe the manner of carrying the same into effect.

On reference to the twelve accompanying diagrams, which form a part of this specification, it will be seen that each diagram consists of two portions, one portion, A, representing the key-board of a piano, or other similar instrument, and the other portion, B, consisting of a series of lines, $x$ $y$, so arranged that there shall be eight spaces $s$ $s$ above each key represented in the key-board. The name of the note produced by striking each key of the key-board, and also the syllable and letter indicating this note, are marked on the key, and in those keys where a note is raised or lowered half a tone this change is indicated by the sign ♯ or ♭ being marked on the key to be sounded, as shown in diagrams 2, 9, and others. The spaces between the lines $y$ $y$ are numbered from 1 to 8 at the side of the portion B of each diagram, and in each space 1, 2, 3, etc., are a number of letters or signs, which indicate that all the keys represented in the key-board opposite the signs in any one space can be struck at one time, and that a harmonious sound or cord will thus be produced, the letter or sign in each space indicating the name or syllable of the note produced by striking the key opposite said sign. The student, before the diagrams are placed in his hands, is thoroughly instructed as to the names of the notes and the manner of producing them by the instrument. When it is desired to teach the student the chords which can be produced in a certain key, as, for instance, the natural key, or key of C, his attention is directed to the diagram 1. In the first space (between the lines $y$ $y$) he will find that the letters C G E C are represented above the keys which produce these notes, C G E C. He is thus informed that these keys, struck together, will produce a chord or combination of notes which will be in harmony with each other. In the second space the letters are so placed as to indicate that the keys producing the notes G D B G should be struck simultaneously to produce the second chord in this key; the third chord consisting of the combination of the notes E C G C represented in the third space, and so on, the eighth chord being merely a repetition of the first, an octave higher in the scale. When the learner desires to familiarize himself with the chords which can be formed in another key, as, for instance, in the key of B, he turns to the diagram 6, where it is apparent that the first chord in this key consists of the combination of the notes B D♯ F♯, and B, the second of the notes C♯ F♯ A♯ F♯, and so on. In like manner the chords which can be produced in other keys, in which either sharps or flats occur, are indicated in the different diagrams, as will be readily understood from the foregoing explanation. The student, when he has one note of a chord, can thus ascertain what other notes should be combined with it to complete the chord; for instance, if he wishes to complete a chord containing the note B, in the key of E, (diagram 5,) he finds, on examining the diagram, that above the key representing the note B three of the spaces $s$ contain the sign or letter designating this note, and thus ascertains that there are three chords in the scale, each containing this note, the first being the chord E B G♯ E, the second B F♯ D♯ B, and the third E G♯ E B. If the note C♯ is taken, but one chord A C♯ A E, containing the note, can be produced in this scale. By the use of these diagrams also the position in the different scales of the semi-tones or half intervals (which occur in every key between the third and fourth and seventh and eighth notes) is indicated much more plainly than when represented in the ordinary manner. In the key of C the juxtaposition of the keys E and F and B and C indicates that there is but half an interval between the notes produced by these keys. In the key of G (shown in diagram No. 2) it is apparent to the pupil that the first half interval, counting from the key-note G, is between the notes B and C, and the second between the notes F sharp, (F♯,) and G, and he thus learns that it is necessary to sharp the note F, instead of using that note, because there should be a half interval between the seventh and eighth notes and not between the sixth and seventh notes. In like manner he learns the reason for using C♯ and F♯ in the key of D, diagram 3, instead of the notes C and F, which would cause the formation of half intervals at improper positions in the scale. The keys in which flats are used are indicated in a manner similar to the above described, as shown in diagrams Nos. 1 to 11, inclusive. The pupil is greatly aided by arranging the two portions A and B so as to form a diagram, in which it is clearly indicated what keys can be struck together to produce a harmonious sound, and also by placing only one of the signs ♯ or ♭ on such black keys as are to be struck, instead of using both signs on one key, as heretofore.

I claim as my invention, and desire to secure by Letters Patent—

1. A diagram, consisting of the representation of a key-board and a series of lines so arranged as to form spaces opposite to the keys represented in the key-board, the said spaces containing signs or marks indicating the keys to be struck together, all substantially as and for the purpose described.

2. A diagram representing a key-board, in which a mark or sign is placed on each black key to be struck, as set forth.

In testimony whereof I have signed my name to this specification in the presence of two subscribing witnesses.

J. C. CLIME.

Witnesses:
    CHAS. E. FOSTER,
    JOHN WHITE.